CURTIS & WORDEN.
Whip Holder.
No. 70,075.
Patented Oct. 22, 1867.
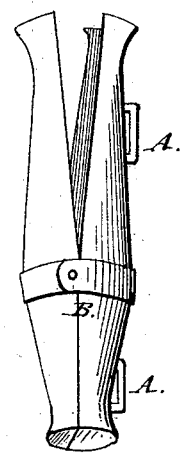
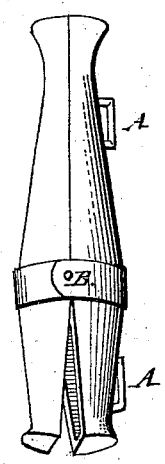
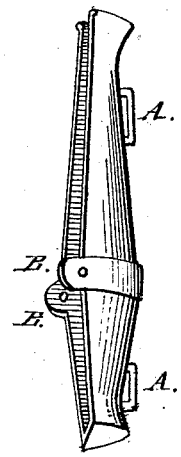
WITNESSES:
INVENTORS:

UNITED STATES PATENT OFFICE.

HENRY M. CURTIS AND ALVA WORDEN, OF YPSILANTI, MICHIGAN.

IMPROVEMENT IN SELF-ADJUSTING WHIP-HOLDER.

Specification forming part of Letters Patent No. 70,075, dated October 22, 1867.

*To all whom it may concern:*

Be it known that we, HENRY M. CURTIS and ALVA WORDEN, of Ypsilanti, in the county of Washtenaw and State of Michigan, have invented a new and useful Machine for Holding Carriage-Whips, which we denominate "Curtis and Worden's Self-Adjusting Whip-Holder;" and we do hereby declare that the following is a full, clear, and exact description of the construction and operation of the same, reference being had to the annexed drawings, making a part of this specification, in which—

Figure 1 is a sectional view. Fig. 2 is a perspective view of the whip-holder complete, and ready for use without the whip. Fig. 3 is a perspective view of the whip-holder complete, closed upon the whip-handle.

The whip-holder is formed of metal, cast or pressed to the desired shape, and is composed of two pieces only, Fig. 1 representing one sectional half, and the other sectional half being formed exactly like it, with the exception of the loops A A, used for the purpose of attaching the same to the carriage-seat or dash-board. Each section of the whip-holder is a cone-shaped half-cylinder, the cone being reversed near the bottom of the whip-holder, forming each half-section bilged or barrel-shaped, and connected together at the bilge by an ear-shaped hinge, B, on each half-section, the ears being connected together by a rivet, forming the hinge. The edge or face of each cylinder-section is formed by an obtuse angle at the hinge, so constructed that when the two sections are connected together at the hinge B the whip-holder above the joints or hinge is open, and shut or closed below from its own weight, as in Fig. 2.

When the whip is inserted the holder opens at the bottom, below the joints or hinge, by the pressure of the whip upon the convex conical sides of the holder, and closes the top of the holder around the whip, thus clasping the whip firmly at the top and bottom of the holder, and holding it steady and firmly in its place.

The whip may be easily drawn out by a perpendicular motion, the holder opening at the top and closing at the bottom, so that the whip is readily detached.

What we claim as our invention, and desire to secure by Letters Patent, is—

The shape and construction of the whip-holder, and the connection of the two sectional halves by hinges or joints, in such a manner as to hold the whip, when inserted, closely and firmly, by clasping the same at the top and bottom of the holder at the same time, the holder being formed of metal, cast or pressed into proper shape, substantially as and for the purpose set forth and described.

HENRY M. CURTIS.
ALVA WORDEN.

Witnesses:
AMOS C. BLODGET,
JOHN W. VAN CLEVE, Jr.